United States Patent [19]

Shimura

[11] Patent Number: 5,169,131
[45] Date of Patent: Dec. 8, 1992

[54] SHOCK ABSORBER
[75] Inventor: Ryota Shimura, Tokyo, Japan
[73] Assignee: Fuji Seiki Kabushiki Kaisha, Japan
[21] Appl. No.: 793,806
[22] Filed: Nov. 18, 1991
[30] Foreign Application Priority Data Apr. 9, 1991 [JP] Japan .................. 3-103360

[51] Int. Cl.⁵ ............................................ B60G 13/04
[52] U.S. Cl. ..................................... 267/221; 188/284
[58] Field of Search ............... 188/300, 311, 312, 313, 188/316, 322.16, 322.17, 285, 286, 287, 322.19; 267/119, 124, 130, 116, 221

[56] References Cited

U.S. PATENT DOCUMENTS

| | | | |
|---|---|---|---|
| 2,713,401 | 7/1955 | Sevsté et al. | 188/316 |
| 3,605,960 | 9/1971 | Singer | 188/287 |
| 3,797,615 | 3/1974 | Stembridge | 188/287 |
| 3,991,863 | 11/1976 | Lee | 267/221 |
| 3,997,037 | 12/1976 | Schupner | 188/287 |
| 4,298,101 | 11/1981 | Dressell, Jr. et al. | 188/287 |
| 4,482,035 | 11/1984 | Heideman et al. | 188/287 |
| 4,768,627 | 9/1988 | Taylor | 188/312 |

FOREIGN PATENT DOCUMENTS

| | | | |
|---|---|---|---|
| 0136030 | 6/1986 | Japan | 188/287 |
| 0163531 | 6/1990 | Japan | 188/316 |

Primary Examiner—Robert J. Oberleitner
Assistant Examiner—Chris Schwartz
Attorney, Agent, or Firm—Steinberg & Raskin

[57] ABSTRACT

A shock absorber capable of effectively functioning even in case of emergency or abnormality, significantly reducing the manufacturing cost and highly simplifying the structure. A piston is arranged so as to divide a liquid chamber defined in a casing into two liquid chamber sections and a liquid passage is arranged so as to cause the chamber sections to communicate with each other. Also, a movable guide member is provided in the casing and a spring is interposed between the guide member and a flange of an actuation rod, so that the return spring permits both actuation rod and movable guide member to carry out the return operation. Thus, the shock absorber eliminates arrangement of an accumulator in the shock absorber.

6 Claims, 3 Drawing Sheets

SHOCK ABSORBER

BACKGROUND OF THE INVENTION

This invention relates to a shock absorber adapted to be used for stopping a movable section of various equipments or stopping an article being transferred, and more particularly to a shock absorber used even in case of emergency such as reckless driving of a movable article or the like.

A shock absorber which has been conventionally used for such a purpose as described above, as shown in FIG. 1, is generally constructed so as to utilize resistance of sealed liquid. More particularly, a conventional shock absorber generally designated by reference numeral 100 in FIG. 1 includes an accumulator 102 arranged in a liquid chamber 104 or a chamber 106 communicating with the liquid chamber 104 in order to absorb liquid of a volume corresponding to volumes of an actuation rod 108 and a piston 110 moving or advancing into the liquid chamber 104. The accumulator 102 is generally formed of a soft rubber material of a single foam.

Unfortunately, the accumulator 102 has a disadvantage that because it is made of a rubber material as described above, closed-cell chambers of the rubber material are broken due to expansion of air when a temperature at which the accumulator 102 is used or stored is increased to a level of 100° C. or more. In addition, the temperature is lowered to a level of 0° C. or below, interstructures or partitions defining the closed-cell chambers are hardened to lead to embrittlement; so that when the accumulator 102 is exposed to a high pressure, it is apt to be broken, to thereby fail to satisfactorily exhibit its function. Thus, the conventional shock absorber has a limitation in serviceability. For example, the conventional shock absorber cannot be used when the service temperature of the shock absorber is caused to be elevated to an excessively high level due to any abnormality or emergency such as reckless driving of a control equipment to which the shock absorber is applied or lowered to an abnormally low level due to any cause.

However, the frequency of such emergency as described above is very low, therefore, a consumer desires a decrease in manufacturing cost of a shock absorber due to disregard for an approach to the above-described problem rather than an increase in the cost due to consideration of the problem. Nevertheless, the conventional shock absorber fails to decrease the manufacturing cost, because the shock absorber 100 requires, in addition to the above-described arrangement of the accumulator 102, arrangement of a return spring 112 for returning the actuation rod 108, as well as a lid member 114 for arranging the return spring 112 at the absorber 100, resulting in the number of parts of the shock absorber being highly increased, leading to an increase in manufacturing cost of the absorber.

SUMMARY OF THE INVENTION

The present invention has been made in view of the foregoing disadvantage of the prior art.

Accordingly, it is an object of the present invention to provide a shock absorber which is capable of effectively functioning even in case of emergency or abnormality.

It is another object of the present invention to provide a sock absorber which is capable of significantly reducing the manufacturing cost.

It is a further object of the present invention to provide a shock absorber which is capable of being highly simplified in construction.

In accordance with the present invention, a shock absorber is provide which includes a casing, a liquid chamber defined in the casing so as to receive liquid therein, a piston arranged in the liquid chamber in a manner to be reciprocated therein, an actuation rod connected at one end thereof to the piston and arranged in the casing in such a manner that a part thereof projects from the casing and a flange mounted on the projecting part of the actuation rod; whereby the liquid in the liquid chamber acts on the piston to absorb shock applied to the actuation rod and the liquid chamber is divided into two liquid chamber sections by means of the piston, so that the liquid chamber sections each are varied in volume due to the reciprocation of the piston. The shock absorber generally constructed as described above comprises a liquid passage is formed in the casing so as to permit the liquid chamber sections to communicate with each other therethrough and a movable guide member liquid-tightly and slidably arranged in the casing to form a movable partition for the liquid chamber. The actuation rod of which one end is connected to the piston as described above is slidably inserted through the movable guide member. The shock absorber further comprises a return spring is arranged between the flange and the movable guide member.

In a preferred embodiment of the present invention, the liquid chamber is defined by cooperation of a bottom wall of the casing, a peripheral wall of the casing and the movable guide member.

In a preferred embodiment of the present invention, the liquid passage is formed in a manner to extend by a predetermined length in the direction of stroke of the piston. The liquid passage may comprise an annular downwardly-tapered recess which is formed on the inner surface of a peripheral wall of the casing in a manner to extend from the intermediate portion of the peripheral wall toward the lower portion thereof and taper off in the downward direction. Alternatively, the liquid passage comprises a groove of a desired width formed on the inner surface of a peripheral wall of the casing.

In a preferred embodiment of the present invention, the flange is formed into a cap-like shape and mounted on the other end of the actuation rod.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
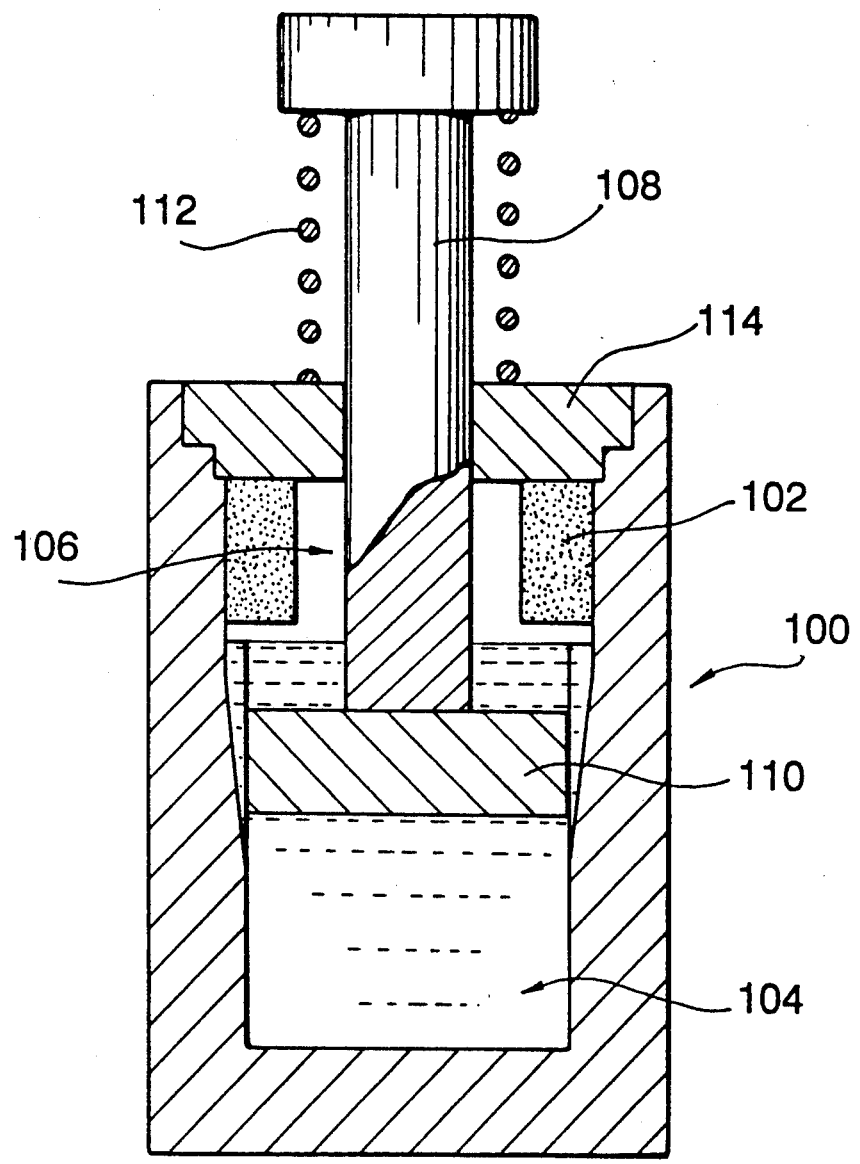
FIG. 1 is a sectional view showing a conventional shock absorber.

Now, a shock absorber according to the present invention will be described hereinafter with reference to FIGS. 2 and 3, wherein like reference numerals designate like parts throughout.

Figure 2:
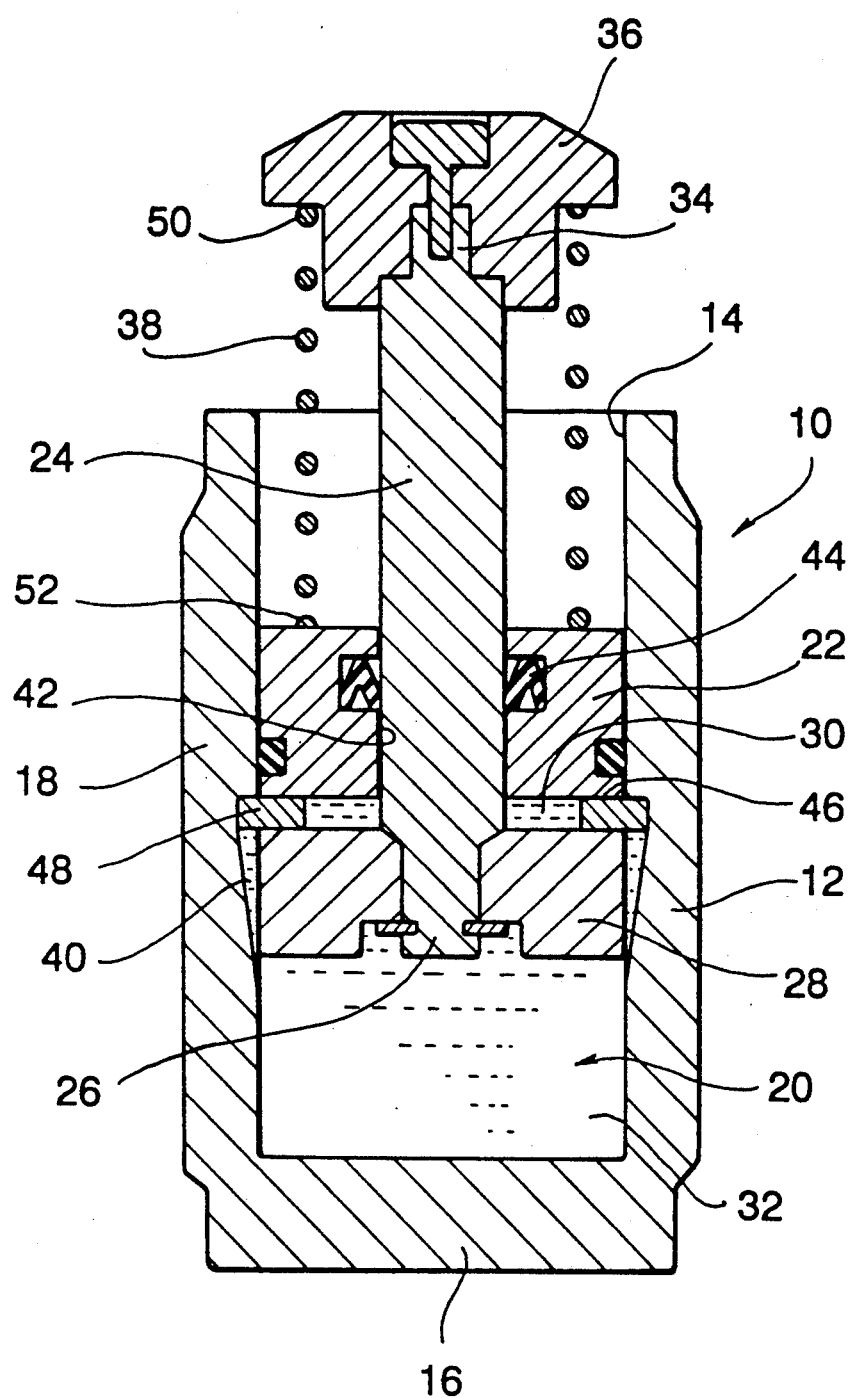
FIG. 2 is a sectional view showing an embodiment of a shock absorber according to the present invention.
Figure 3:
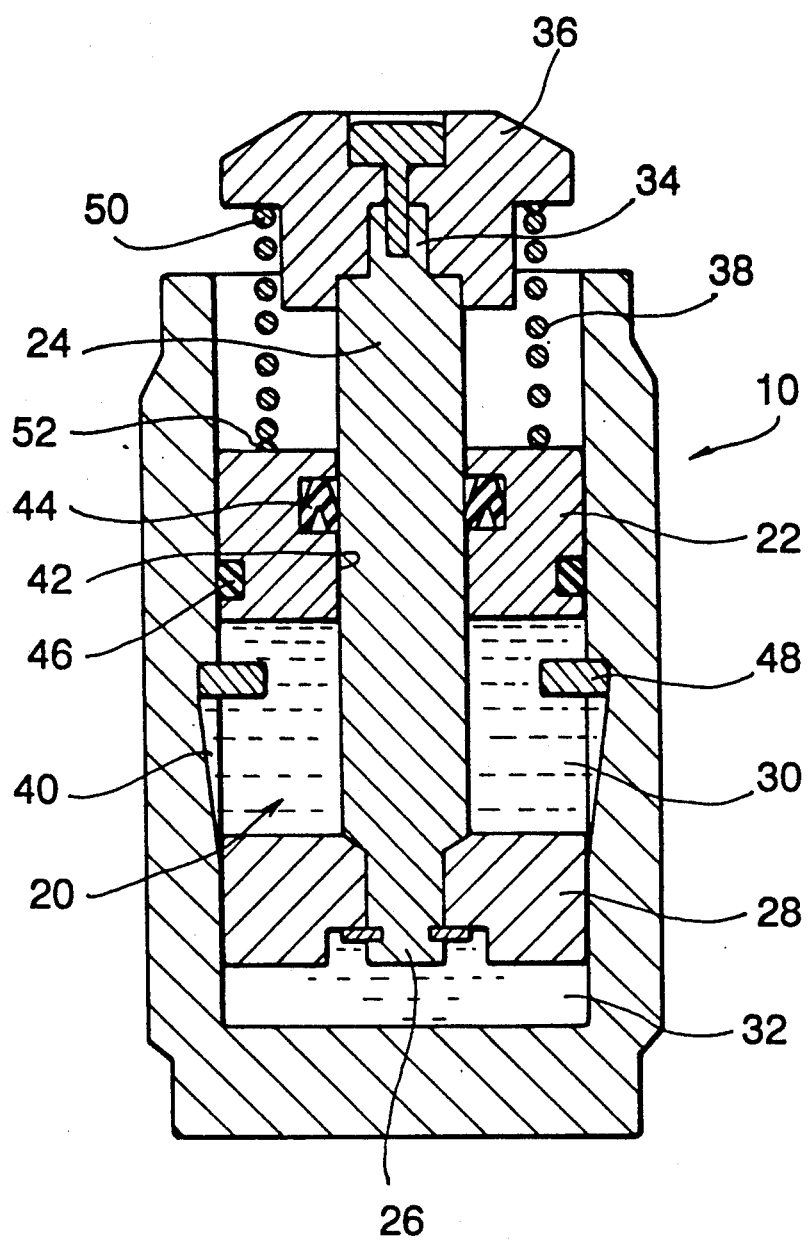
FIG. 3 is a sectional view showing the manner of actuation of the shock absorber shown in FIG. 2.

FIG. 2 shows an embodiment of a shock absorber according to the present invention. A shock absorber of the illustrated embodiment generally designated by reference numeral 10 in FIG. 2 includes a casing 12. In the illustrated embodiment, the casing 12 is formed into a closed-end cylindrical shape so that one end or top end 14 thereof is open and the other end or bottom end 16 is closed with a bottom end wall. Further, the casing 12 includes a cylindrical peripheral wall 18. In the so-formed casing 12 is defined a liquid chamber 20 due to cooperation of the bottom wall 16, the peripheral wall 18 and a movable guide member 22 which will be detailedly described hereinafter. The liquid chamber 20 is charged therein with a liquid material of high viscous resistance such as silicone oil or the like.

The shock absorber 10 of the illustrated embodiment also includes an actuation rod 24 reciprocatedly inserted into the casing 12 and having a distal end or front end 26 positioned in the casing 12. The distal end 26 of the actuation rod 24 has a piston 28 fixedly mounted thereon, so that it may be reciprocated with reciprocation of the actuation rod 24. The piston 28 may be formed into any desired configuration. In the illustrated embodiment, it is formed into a solid cylindrical shape. The arrangement of the piston 28 in the casing 12 causes the liquid chamber 20 to be divided into two liquid chamber sections. More particularly, in the illustrated embodiment, the piston 28 vertically divides the liquid chamber 20 into an upper liquid chamber section 30 and a lower liquid chamber section 32.

The actuation rod 24 is so arranged that the upper portion thereof including the proximal end or upper end 34 thereof upwardly projects from the top end of the casing 12. The actuation rod 24 is provided at the portion thereof projecting from the casing 12 with a flange 36 for supporting a return spring 38. The flange 36 is arranged so as to outwardly project from the actuation rod 24. In the illustrated embodiment, the flange 36 is formed into a cap-like shape and mounted on the upper end 34 of the actuation rod 24.

The shock absorber 10 further includes a liquid passage 40 defined in the liquid chamber 20 so as to extend by a predetermined length in the longitudinal direction of the casing 12 or in the direction of stroke of the piston 28. In the illustrated embodiment, the liquid passage 40 comprises a downwardly-tapered recess which is formed on the inner surface of the cylindrical or peripheral wall 18 of the casing 12 in a manner to vertically extend from the intermediate portion of the inner surface toward the lower portion thereof and taper off in the downward direction or be downwardly gradually reduced in diameter or cross section. The passage 40 may be formed into an annular shape or so as to extend in the whole circumferential direction of the liquid chamber 20. Alternatively, it may comprise a groove of a desired width formed on the inner surface of the peripheral wall 18. The groove may be formed into an annular shape or so as to extend in the whole circumferential direction of the liquid chamber 20.

The movable guide member 22 is liquid-tightly and slidably arranged in the casing 12. The movable guide member 22 is formed at the central portion thereof with a vertically extending through-hole 42, via which the actuation rod 24 is slidably inserted. The movable guide member 22 is provided on both inner and outer peripheral surfaces thereof with packings 44 and 46, respectively, resulting in ensuring liquid sealing. In the peripheral wall 18 of the casing 12 is fitted a stopper ring 46 which functions to regulate a range of movement of the movable guide member 22 and prevent the piston 28 from being released from the casing 12.

Thus, in the illustrated embodiment, the liquid chamber 20 is defined by cooperation of the bottom wall 16 of the casing 12, the peripheral wall 18 of the casing 12 and the movable guide member 22, and the movable guide member serves as a movable partition which forms a part of the liquid chamber 20.

The return spring 38 is supported at one end of the upper end 50 thereof on the flange 36 and at the other end or lower end 52 thereof on the movable guide member 22, resulting in being interposedly arranged between the flange 36 and the movable guide member 22.

Now, the manner of operation of the shock absorber of the illustrated embodiment constructed as described above will be described hereinafter with reference to FIGS. 1 and 2.

First, supposing that malfunction occurs in a control equipment on which the shock absorber of the illustrated embodiment is mounted, to thereby cause the cap-like flange 36 mounted on the proximal end 34 of the actuation rod 24 to be exposed to external force of a high level, the actuation rod 24 is moved toward the bottom end 16 of the casing 12. This causes the piston 28 to be downwardly forced toward the bottom end 16 of the casing, so that liquid in the lower liquid chamber section 32 is caused to flow through the liquid passage 40 to the upper liquid chamber section 30. This results in the liquid producing dynamic resistance and viscous resistance, so that shock to which the actuation rod 24 is exposed may be effectively absorbed by the liquid. In addition, the configuration of the liquid passage 40 permits the sectional area of the liquid passage 40 to be gradually reduced toward the bottom end 16 of the casing 12, so that the fluid is gradually increased in resistance toward the lower end of the liquid passage 40 to permit the shock absorbing characteristics of the shock absorber to be further enhanced.

At this time, the actuation rod 24 is moved or advanced into the liquid chamber 20 by a distance equal to the stroke of the piston 28. This results in the liquid being discharged in volume corresponding to the advance of the piston 28 and actuation rod 24 to cause the liquid to be increased in pressure, so that the movable guide member 22 is upwardly forcibly slid against the frictional resistance of the packings 44 and 46 and the elastic force of the return spring 38 to a position shown in FIG. 3.

Then, when the external force applied to the cap-like flange 36 is removed, the return spring 38 acts to return each of the movable guide member 22 and actuation rod 24 to the original position. This causes liquid flowing into the upper liquid chamber section 30 to flow through the liquid passage 40 to the lower liquid chamber section 32, so that the sock absorber 10 may be returned to the state shown in FIG. 2.

As can be seen from the foregoing, the shock absorber of the present invention is so constructed that the movable guide member 22 is arranged in the casing 12. Such construction of the present invention eliminates a necessity of arranging an accumulator and the like. Also, the construction requires only one return spring in order to actuate two members or the movable guide member and actuation rod, resulting in simplifying the structure of the shock absorber and reducing the manufacturing cost of the shock absorber. Further, the present invention eliminates arrangement of any accumulator, so that the shock absorber may be serviceable even in an environment of an excessively low or high temperature. Thus, the shock absorber of the present invention satisfactorily exhibits its function even in case of emergency.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A shock absorber comprising: a casing:

a liquid chamber defined in said casing so at to receive liquid therein;

a piston arranged in said liquid chamber in a manner to be reciprocated therein;

an actuation rod connected at one end thereof to said piston and arranged in said casing in such a manner that a part thereof projects from said casing;

a flange mounted on said projecting part of said actuation rod;

said liquid in said liquid chamber acting on said piston to absorb shock applied to actuation rod;

said liquid chamber being divided into two liquid chamber sections by means of said piston, so that said liquid chamber sections each are varied in volume due to the reciprocation of said piston;

a liquid passage formed in said casing so as to permit said liquid chamber sections to communicate with each other therethrough;

a movable guide member liquid-tightly and slidably arranged in said casing to define a movable partition for said liquid chamber;

said actuation rod of which said one end is connected to said piston being slidably inserted through said movable guide member; and a return spring having a first end contacting said flange and a second end contacting said movable guide member.

2. A shock absorber as defined in claim 1, wherein said liquid chamber is defined by cooperation of a bottom wall of said casing, a peripheral wall of said casing and said movable guide member.

3. A shock absorber as defined in claim 1, wherein said liquid passage is formed in a manner to extend by a predetermined length in the direction of stroke of the piston.

4. A shock absorber as claimed in claim 3, wherein said liquid passage comprises an annular downwardly-tapered recess which is formed on the inner surface of a peripheral wall of said casing in a manner to extend from the intermediate portion of said peripheral wall toward the lower portion thereof and taper off in the downward direction.

5. A shock absorber as defined in claim 1, wherein said liquid passage comprises a groove of a desired width formed on the inner surface of a pheripheral wall of said casing.

6. A shock absorber as defined in claim 1, wherein said flange is formed into a cap-like shape and mounted on the other end of said actuation rod.

* * * * *